(12) United States Patent
Hasegawa

(10) Patent No.: US 10,464,152 B2
(45) Date of Patent: Nov. 5, 2019

(54) WIRE ELECTRICAL DISCHARGE MACHINE AND WIRE ELECTRICAL DISCHARGE MACHINING METHOD

(71) Applicant: FANUC CORPORATION, Yamanashi (JP)

(72) Inventor: Yasuo Hasegawa, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 279 days.

(21) Appl. No.: 15/661,130

(22) Filed: Jul. 27, 2017

(65) Prior Publication Data

US 2018/0029152 A1 Feb. 1, 2018

(30) Foreign Application Priority Data

Jul. 28, 2016 (JP) .................................. 2016148102
Jun. 12, 2017 (JP) .................................. 2017114942

(51) Int. Cl.
| B23H 7/16 | (2006.01) |
| B23H 1/02 | (2006.01) |
| B23H 7/04 | (2006.01) |
| B23H 7/20 | (2006.01) |
| B23H 11/00 | (2006.01) |

(52) U.S. Cl.
CPC ............. *B23H 7/16* (2013.01); *B23H 1/02* (2013.01); *B23H 7/04* (2013.01); *B23H 7/20* (2013.01); *B23H 11/00* (2013.01)

(58) Field of Classification Search
CPC ..... B23H 1/02; B23H 7/04; B23H 7/20; B23H 11/00; B23H 7/16; G05B 2219/45043
See application file for complete search history.

(56) References Cited

U.S. PATENT DOCUMENTS

| 2014/0014625 A1 | 1/2014 | Yamaoka et al. | |
| 2014/0364992 A1* | 12/2014 | Abe ......................... | B23H 7/20 700/162 |
| 2014/0374385 A1* | 12/2014 | Kawano ................... | B23H 7/04 219/69.12 |
| 2015/0094845 A1* | 4/2015 | Inukai ...................... | B23H 7/04 700/162 |

(Continued)

FOREIGN PATENT DOCUMENTS

| JP | S57-96724 A | 6/1982 |
| JP | H8-39356 A | 2/1996 |
| JP | 2008-100338 A | 5/2008 |

(Continued)

OTHER PUBLICATIONS

Extended European Search Report in EP Application No. 17001276.9, dated Jan. 25, 2018, 7 pp.

*Primary Examiner* — Geoffrey S Evans
(74) *Attorney, Agent, or Firm* — Hauptman Ham, LLP

(57) ABSTRACT

A machining condition setter in a wire electrical discharge machine, sets up: as machining conditions, a first machining condition for enabling the core fixing function in a first section on the upstream side; a second machining condition for enabling formation of a slot in the workpiece in a second section on the downstream side; and a medial machining condition that is different from the first machining condition and the second machining condition in a medial section located between the first section and the second section.

16 Claims, 12 Drawing Sheets

(56) References Cited

U.S. PATENT DOCUMENTS

2015/0352647 A1\* 12/2015 Abe .................. B23H 7/06
219/69.12
2016/0001385 A1 1/2016 Nakashima et al.

FOREIGN PATENT DOCUMENTS

| JP | 2013-829 A | 1/2013 |
|---|---|---|
| JP | JP5426733 B2 | 2/2014 |
| JP | 2014-079876 A | 5/2014 |
| JP | 2016-16463 A | 2/2016 |

\* cited by examiner

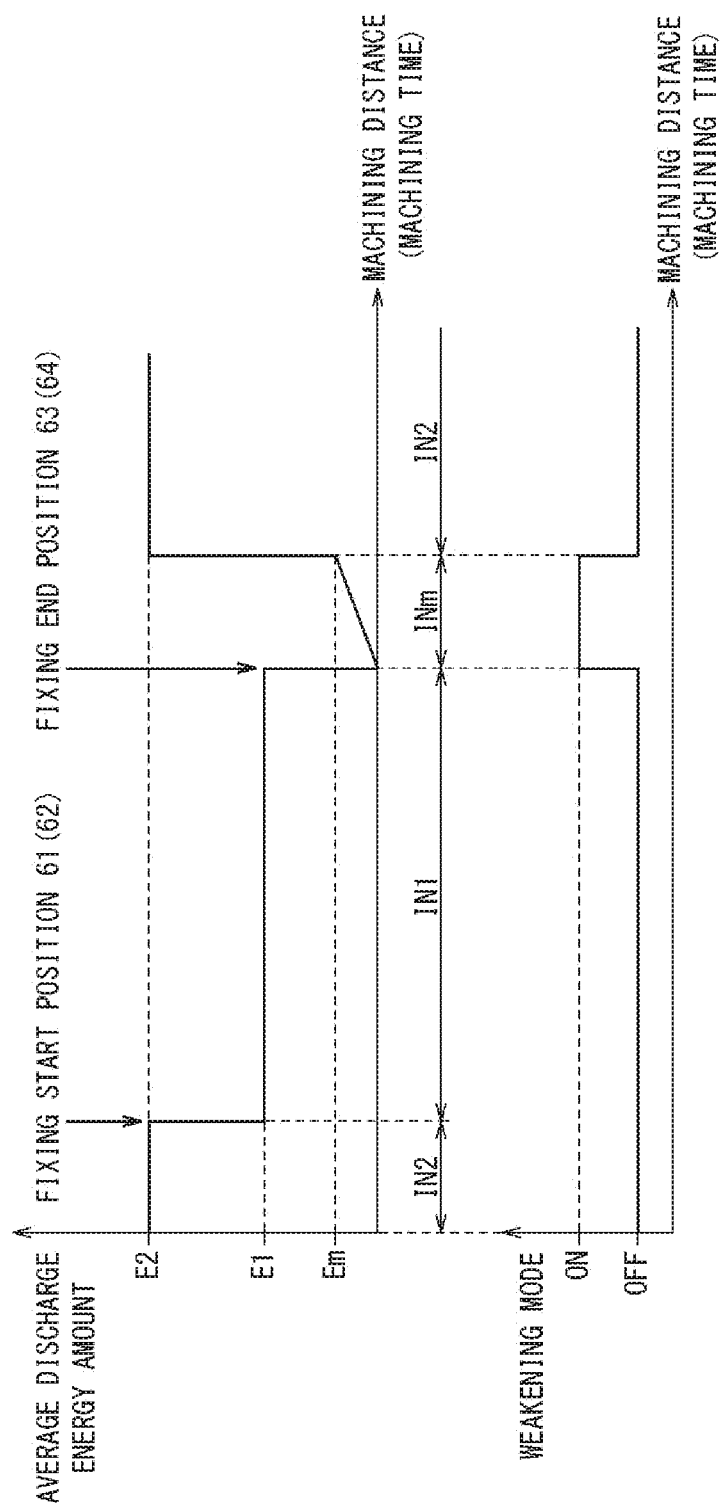

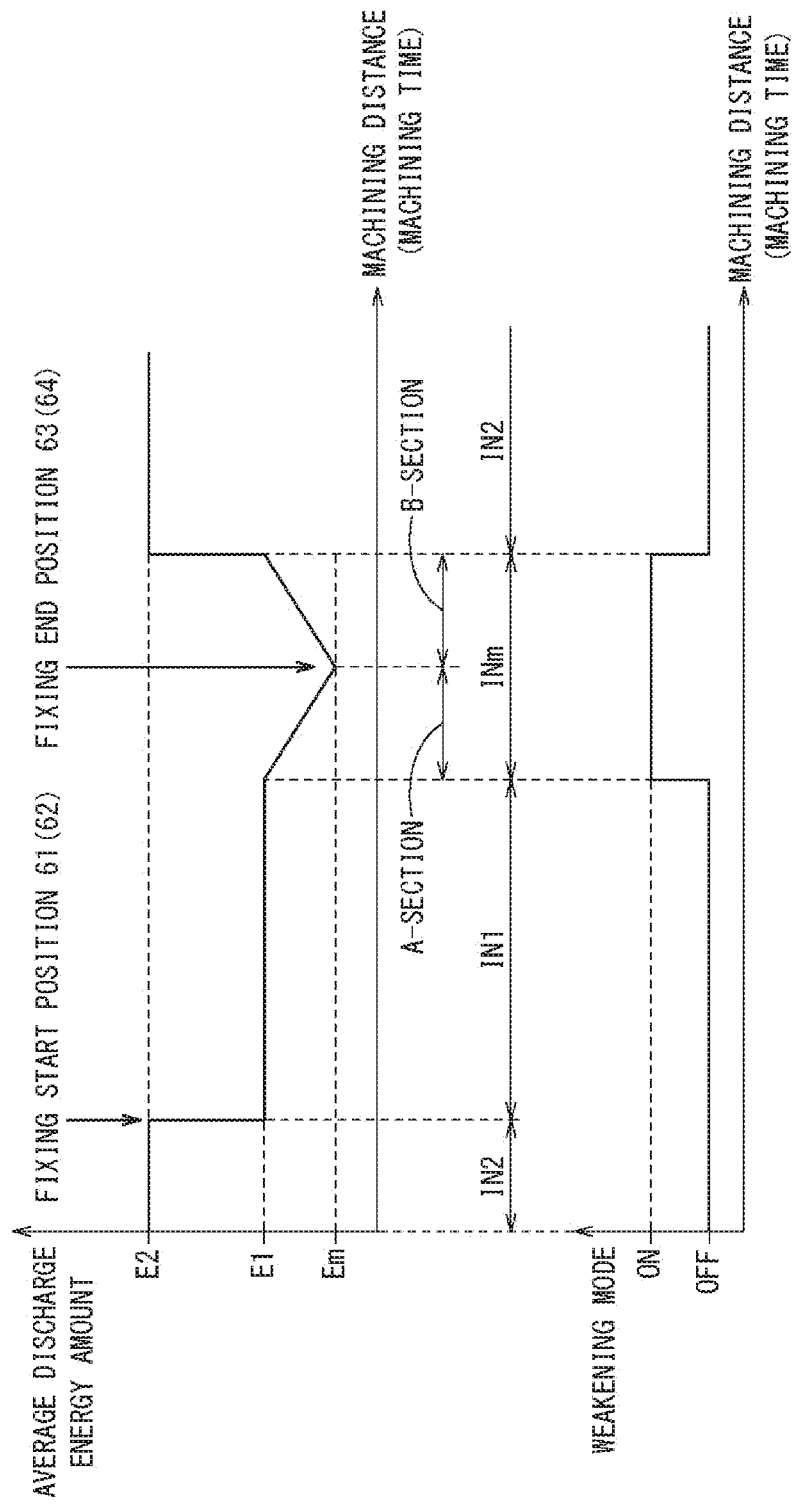

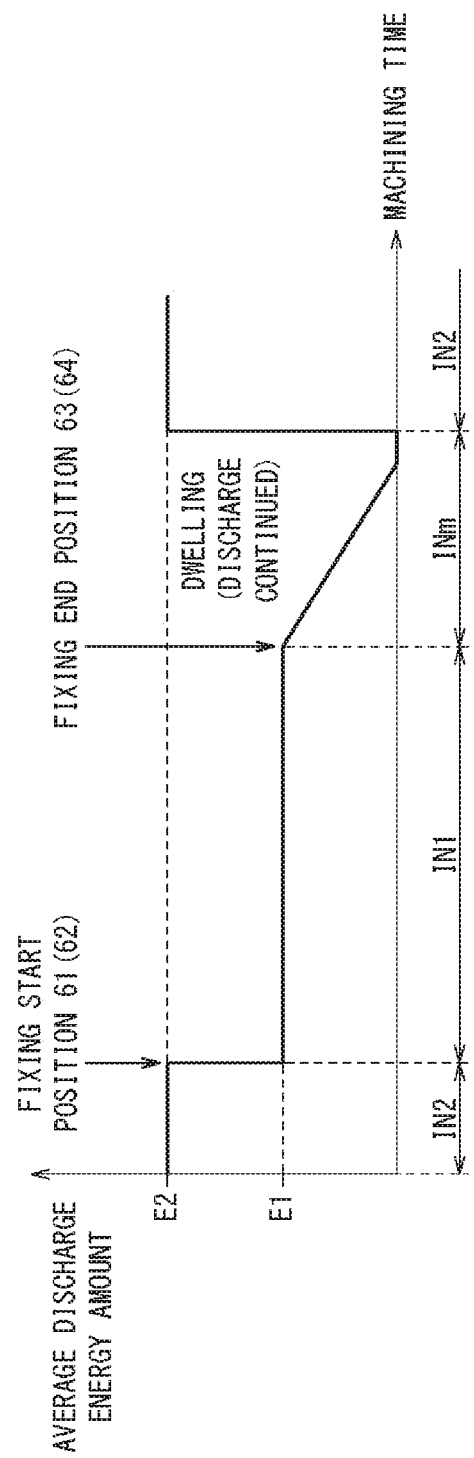

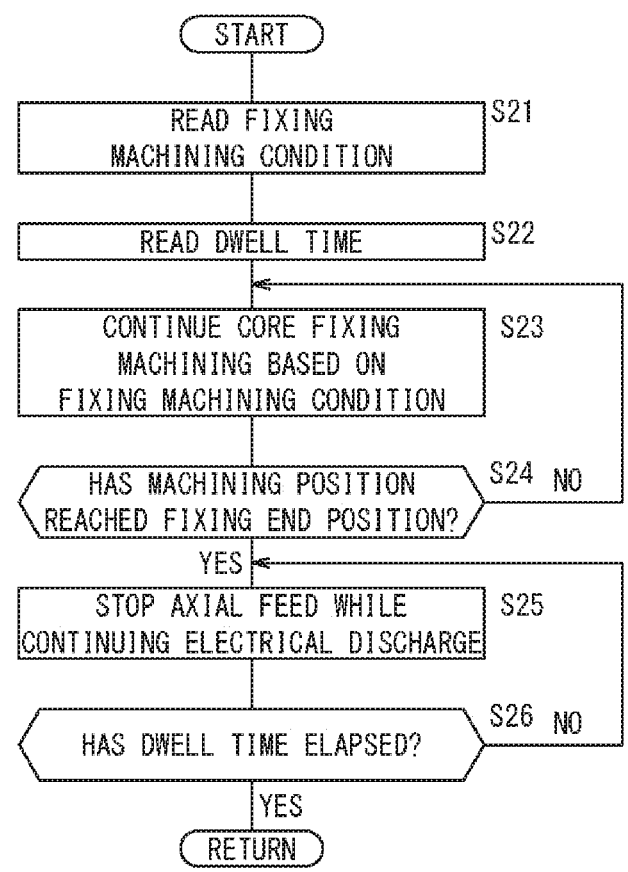

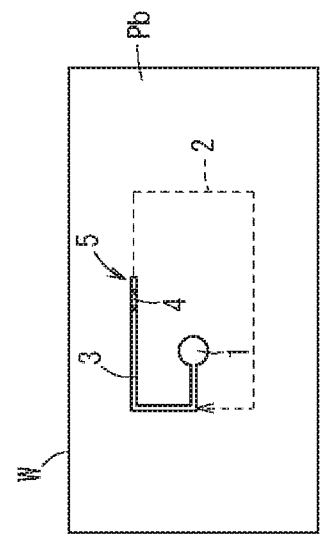
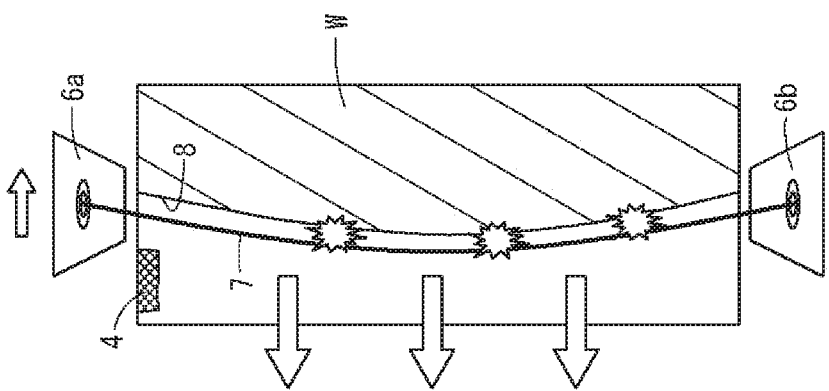
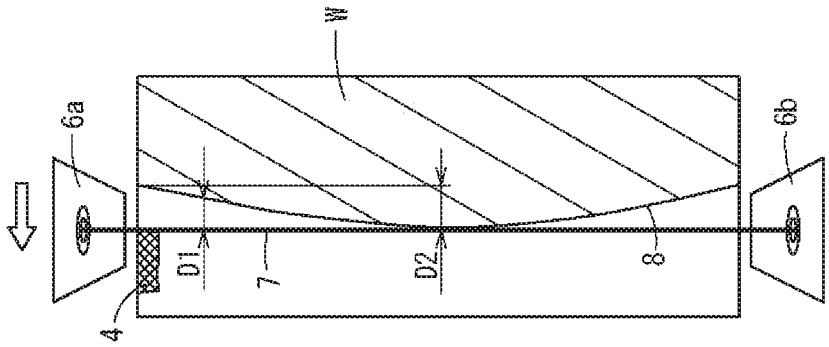

WIRE ELECTRICAL DISCHARGE MACHINE AND WIRE ELECTRICAL DISCHARGE MACHINING METHOD

CROSS-REFERENCE TO RELATED APPLICATIONS

This application is based upon and claims the benefit of priority from Japanese Patent Applications No. 2016-148102 filed on Jul. 28, 2016 and No. 2017-114942 filed on Jun. 12, 2017, the contents all of which are incorporated herein by reference.

BACKGROUND OF THE INVENTION

Field of the Invention

The present invention relates to a wire electrical discharge machine and a wire electrical discharge machining method that have a core fixing function for fixing a core formed by electrical discharge machining.

Description of the Related Art

Conventionally, various wire electrical discharge machines have been developed for performing electrical discharge machining on a workpiece by electric discharge generated between a wire electrode and a workpiece. For example, there is known a so-called core fixing function which uses a phenomenon that components of the wire electrode adhere to the workpiece during electric discharge to fix the formed core to the base material of the workpiece (Japanese Patent No. 5426733).

Generally speaking, this core fixing function is very effective in machining to form numerous cores in one or multiple workpieces. This is because, for a large number of cores, [1] roughing of the workpiece, [2] removal of cores, and [3] finishing of the workpiece can be executed ail at once, hence efficiency improvement and automatic operation of the entire process can be expected.

SUMMARY OF THE INVENTION

When forming a fixing part in a clearance of a machined slot by using the aforementioned core fixing function, it is necessary to change the conditions (hereafter, machining condition) related to the electrical discharge machining at the timing of performing on/off switching operation of this function. However, rapid change of the machining condition may cause decrease or loss of discharge repulsive force acting on the wire electrode, so that the gap for discharge between the wire electrode and the workpiece may disappear. As a result, there is a concern that part of the wire electrode touches the workpiece and fixing part at the same time and cannot be released from the short-circuited state.

In addition, rapid change of the machining condition makes it likely to cause instantaneous discharge and instantaneous short-circuit between the wire electrode and the fixing portion, hence increases the risk of the wire electrode being disconnected at the locally heated location. Particularly, if the wire electrode is disconnected, the fixing portion reduces the spatial margin in the machined slot, which impedes connection and movement of the wire electrode, so that it is expected that restart of electrical discharge machining from the interrupted position is difficult. To sum up, there is yet room for improvement in controlling electrical discharge machining under a transient state where the core fixing function is switched from on to off.

The present invention has been devised to solve the above-described problems, and it is therefore an object of the present invention to provide a wire electrical discharge machine and a wire electrical discharge machining method that can avoid unintentional incapability of restarting under a transient state where the core fixing function is switched from on to off and also can suppress unintentional disconnection of the wire electrode.

A wire electrical discharge machine according to the first invention is a machining apparatus that performs electrical discharge machining on a workpiece along a machining path by generating electric discharge between a wire electrode and the workpiece while moving the wire electrode and the workpiece relatively to each other and has a core fixing function of fixing a core created by the electrical discharge machining to a base material of the workpiece by adhering and depositing a component of the wire electrode arising from the electric discharge machining, the machining apparatus including: a machining condition setter configured to set up a machining condition related to the electrical discharge machining for each of multiple sections on the machining path; and an electrical discharge machining controller configured to perform control of the electrical discharge machining in accordance with the machining condition set for each section by the machining condition setter. The machining condition setter is configured to set up: as the machining conditions, a first machining condition for enabling the core fixing function in a first section on an upstream side; a second machining condition for enabling formation of a slot in the workpiece in a second section on a downstream side; and a medial machining condition that is different from the first machining condition and the second machining condition in a medial section located between the first section and the second section.

In this way, since the medial machining condition different from both the first machining condition and the second machining condition is set in the medial section between the first section on the upstream side and the second section on the downstream side, it is possible to change the machining condition in the medial section, stepwise from the first machining condition to the second machining condition. That is, changing the first machining condition in a stepwise manner makes it possible to reduce the influence from physical factors on the wire electrode, hence prevent the wire electrode from approaching or contacting the fixing portion formed immediately before. With this, it is possible to prevent occurrence of an unintentional unrestorable event under a transient state where the core fixing function is switched from on to off and avoid unexpected disconnection of the wire electrode.

Particularly, in the wire electrical discharge machine having the core fixing function, the spatial margin in the machining slot is narrowed by the formed fixing portion, so that the connection and movement of the wire electrode is hindered. The present invention can exhibit remarkable effectiveness in such a situation.

In the first invention, the medial section has a start point upstream of an end position of the core fixing function and an end point at a position of the end position of the core fixing function and the machining condition setter may set the medial machining condition by suppressing the electrical discharge machining in comparison with the first machining condition.

In the first invention, the medial section has a start point at an end position of the core fixing function and an end point at a position downstream of the end position of the core fixing function and the machining condition setter may set the medial machining condition with the electrical discharge machining suppressed in comparison with the second machining condition.

In the first invention, the medial section has a start point upstream of an end position of the core fixing function and an end point at a position downstream of the end position of the core fixing function and the machining condition setter may set the medial machining condition with the electrical discharge machining suppressed in comparison with the first machining condition, from the start point of the medial section to the end position of the core fixing function, and sets the medial machining condition with the electrical discharge machining suppressed in comparison with the second machining condition, from the end position of the core fixing function to the end point of the medial section.

In the first invention, the machining condition setter may specify the medial machining condition, with such settings as to, in comparison with the first machining condition, lower the average amount of discharge energy between the wire electrode and the workpiece, lower the machining speed of the workpiece, weaken the fluid pressure of the dielectric working fluid, reduce the flow rate of the dielectric working fluid, weaken the tension of the wire electrode, or make the discharge gap between the wire electrode and the workpiece greater, or by using any combination of the above settings.

In the first invention, the machining condition setter may specify the medial machining condition so as to relatively reduce the average amount of discharge energy in comparison with the first machining condition by narrowing the pulse width of the discharge current supplied between the wire electrode and the workpiece, lowering the peak current of the discharge current, or extending the rest time of the current pulse of the discharge current, or by using a combination of the above settings.

In the first invention, the machining condition setter may specify the medial machining condition, with such settings as to, in comparison with the second machining condition, lower the average amount of discharge energy between the wire electrode and the workpiece, lower the machining speed of the workpiece, weaken the fluid pressure of the dielectric working fluid, reduce the flow rate of the dielectric working fluid, weaken the tension of the wire electrode, or make the discharge gap between the wire electrode and the workpiece greater, or by using any combination of the above settings.

In the first invention, the machining condition setter may specify the medial machining condition so as to relatively reduce the average amount of discharge energy in comparison with the second machining condition by narrowing the pulse width of the discharge current supplied between the wire electrode and the workpiece, lowering the peak current of the discharge current, or extending the rest time of the current pulse of the discharge current, or by using a combination of the above settings.

In the first invention, the machining condition setter may set the medial machining condition so as to include execution of dwell machining.

A wire electrical discharge machine according to the second invention is a machining apparatus that performs electrical discharge machining on a workpiece along a machining path by generating electric discharge between a wire electrode and the workpiece while moving the wire electrode and the workpiece relatively to each other and has a core fixing function of fixing a core created by the electrical discharge machining to a base material of the workpiece by adhering and depositing a component of the wire electrode arising from the electric discharge machining, the machining apparatus including: a machining condition setter configured to set up a machining condition related to the electrical discharge machining for each of multiple sections on the machining path; and an electrical discharge machining controller configured to perform control of the electrical discharge machining in accordance with the machining condition set for each section by the machining condition setter. The machining condition setter sets up: a first machining condition for enabling the core fixing function in a first section on an upstream side; a second machining condition for enabling formation of a slot in the workpiece in a second section on a downstream side; and an execution of dwell machining in the first machining condition, at the end position of the first section.

In this way, dwell machining is performed at the end position of the first section, it is possible to remove unmachined area remaining on the side of the machining direction (in the forward direction) by this dwell machining. That is, enlarging the discharge gap makes it possible to prevent the wire electrode from approaching or contacting the fixing portion formed immediately before. As a result, it is possible to prevent occurrence of an unintentional unrestorable event under a transient state where the core fixing function is switched from on to off and avoid unexpected disconnection of the wire electrode.

A wire electrical discharge machining method according to the third invention is a method used in a wire electrical discharge machine that performs electrical discharge machining on a workpiece along a machining path by generating electric discharge between a wire electrode and the workpiece while moving the wire electrode and the workpiece relatively to each other, and has a core fixing function of fixing a core created by the electrical discharge machining to a base material of the workpiece by adhering and depositing a component of the wire electrode arising from the electric discharge machining. This method includes: a setting step of setting a machining condition related to the electrical discharge machining for each of multiple sections on the machining path; and a control step of performing control of the electrical discharge machining in accordance with the machining condition set for each section at the setting step. Set as the machining conditions at the setting step are a first machining condition for effecting the core fixing function in a first section on an upstream side; a second machining condition for enabling formation of a slot in the workpiece in a second section on a downstream side; and a medial machining condition that is different from the first machining condition and the second machining condition in a medial section located between the first section and the second section.

According to the wire electrical discharge machine and wire electrical discharge machining method of the present invention, it is possible to prevent occurrence of an unintentional unrestorable event under a transient state where the core fixing function is switched from on to off and avoid unexpected disconnection of the wire electrode.

The above and other objects features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 7 is a time chart showing temporal change in machining condition for controlling the electrical discharge machining shown in FIG. 4B;

FIG. 8 is a time chart showing temporal change in machining condition for controlling the electrical discharge machining shown in FIG. 4C;

FIG. 9 is a time chart showing temporal change in machining condition for controlling the electrical discharge machining shown in FIG. 4B;

FIG. 10 is a flowchart for controlling the electrical discharge machining corresponding to the time chart of FIG. 9;

FIGS. 11A to 11C are schematic diagrams for explaining conventional problems when a core fixing function is used; and, FIGS. 12A to 12C are schematic diagrams for explaining conventional problems when a core fixing function is used.

DESCRIPTION OF THE PREFERRED EMBODIMENTS

Referring now to the accompanying drawings, the wire electrical discharge machines according to the present invention will be explained in detail by describing preferred embodiments in relation with wire electrical discharge machining methods.

Overall Structure of Wire Electrical Discharge Machine 10

Figure 1:
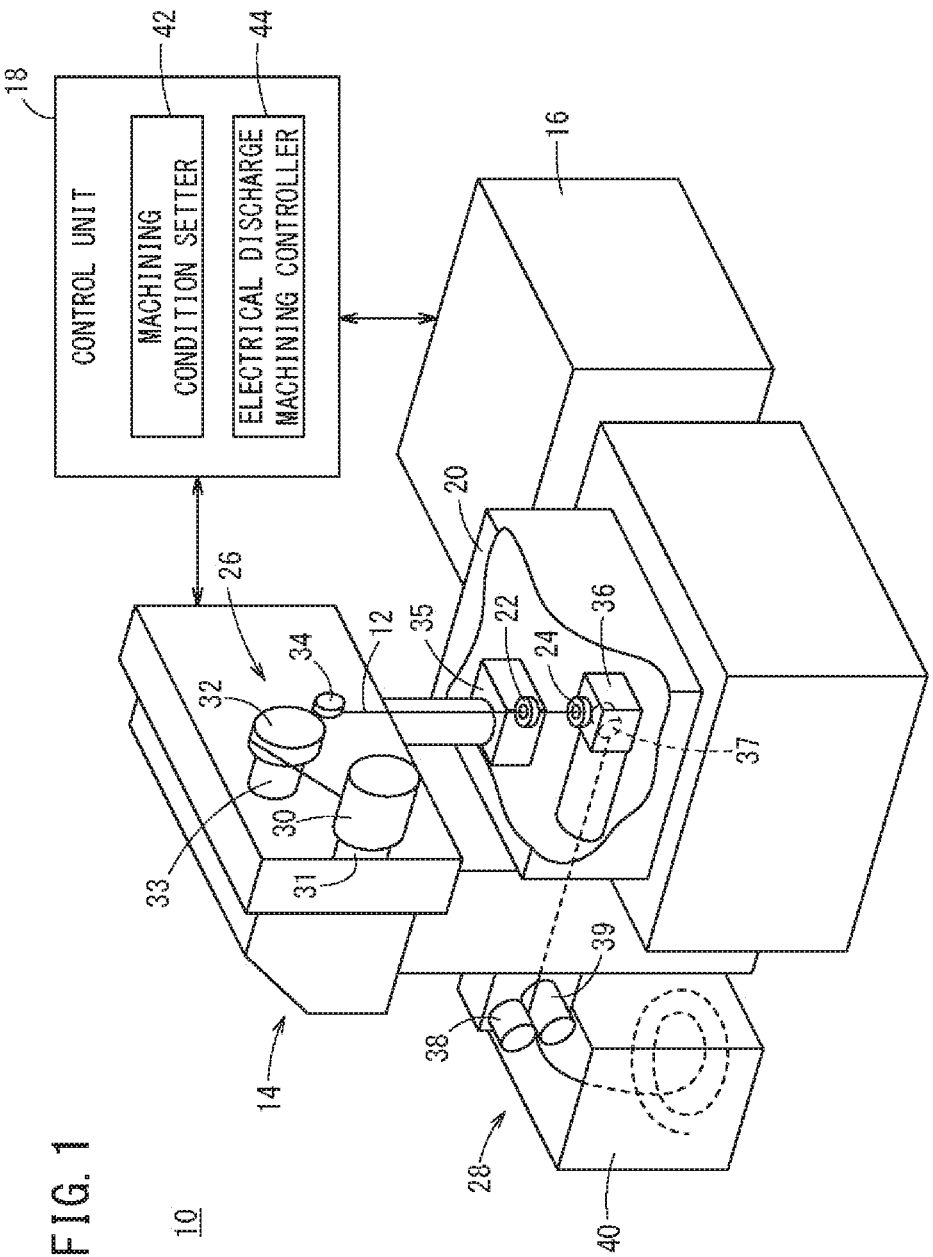
FIG. 1 is an overall configuration diagram of a wire electrical discharge machine according to an embodiment.

FIG. 1 is an overall configuration diagram of a wire electrical discharge machine 10 in this embodiment. The wire electrical discharge machine 10 is a machine tool that performs electrical discharge machining on a workpiece W (FIGS. 2A and 2B) along a machining path 50 (FIG. 2A) by applying electric discharge generated between a wire electrode 12 and the workpiece W. The wire electrical discharge machine 10 basically includes a main machine body 14, a dielectric working fluid processing unit 16 and a control unit 18.

The wire electrode 12 is formed of, for example, metal material such as tungsten-based, copper-alloy based and brass-based material. On the other hand, the material of the workpiece W is, for example, iron-based material or superhard material. Here, the workpiece W is a part in which a core Pc is formed, for example, a punching die plate.

The main machine body 14 includes a work pan 20 capable of storing a dielectric working fluid (not shown) used in electrical discharge machining, a pair of die guides 22 and 24 arranged opposite to each other in the work pan 20. A string-like wire electrode 12 is extended and connected between the die guides 22 and 24 in the height direction of the work pan 20.

The main machine body 14 further includes a supply system 26 for supplying the wire electrode 12 toward the upper die guide 22 and a collection system 28 for collecting the wire electrode 12 from the lower die guide 24.

The supply system 26 includes a wire bobbin 30 with the wire electrode 12 wound thereon, a torque motor 31 capable of applying a torque to the wire bobbin 30, a brake shoe 32 for applying a braking force by friction to the wire electrode 12, a braking motor 33 capable of applying a braking torque to the brake shoe 32, a tension detector 34 for detecting the tension of the wire electrode 12 and an upper guide unit 35 including the aforementioned die guide 22.

The collection system 28 includes a lower guide unit 36 including the aforementioned die guide 24, a guide roller 37 for guiding the wire electrode 12 while changing its orientation, a pinch roller 38 and feed roller 39 capable of nipping the wire electrode 12 and a wire collection box 40 for collecting the wire electrode 12 conveyed by the pinch roller 38 and feed roller 39.

The workpiece W is placed on a table (not shown) in the work pan 20. The main machine body 14 can move at least one of the upper guide unit 35 (lower guide unit 36) and the table so as to allow relative movement between the wire electrode 12 and the workpiece W.

The dielectric working fluid processing unit 16 is a device that removes the machined waste (sludge) produced in the work pan 20 and adjusts the electric resistivity and the temperature to control the liquid quality of the dielectric working fluid (for example, water or oil). This dielectric working fluid processing unit 16 is configured to be able to adjust the fluid pressure or flow rate of the dielectric working fluid and supply the dielectric working fluid into the work pan 20. More specifically, the dielectric working fluid with its fluid pressure/flow rate adjusted is injected from a nozzle (not shown) provided in the upper guide unit 35 or the lower guide unit 36 toward the wire electrode 12 in the work pan 20.

The control unit 18 is a device that controls electrical discharge machining by the main machine body 14 and dielectric working fluid processing unit 16. Specifically, the control unit 18 functions as a machining condition setter 42 that sets up a machining condition related to electrical discharge machining and an electrical discharge machining controller 44 performing control of electrical discharge machining.

The machining condition means a combination of control parameters for specifying control settings in electrical discharge machining, including electrical and physical control conditions of the wire electrode 12 and spraying conditions of the working fluid. "Fixing machining condition" (first machining condition) to be described later is a machining condition that enables fixing tabs 56, 57 (FIG. 2A) to be formed on the workpiece W by executing the core fixing function. "Normal machining condition" (second machining condition) is a machining condition that enables slots 58, 59 (FIG. 2A) to be formed in the workpiece W without using the core fixing function.

The term "core fixing function" refers to a function of fixing a formed core Pc (see FIGS. 2A and 2B) to the workpiece W by utilizing a phenomenon that a component of the wire electrode 12 adheres to the base material (see the same drawing), designated by Pb, of the workpiece W during discharge. Herein, it is assumed that [1] roughing of the workpiece W, [2] removal of the core Pc, and [3] finishing of the workpiece W are sequentially performed by the core fixing function of the wire electrical discharge machine 10.

Configurational Characteristic of Workpiece W

Figure 2A:
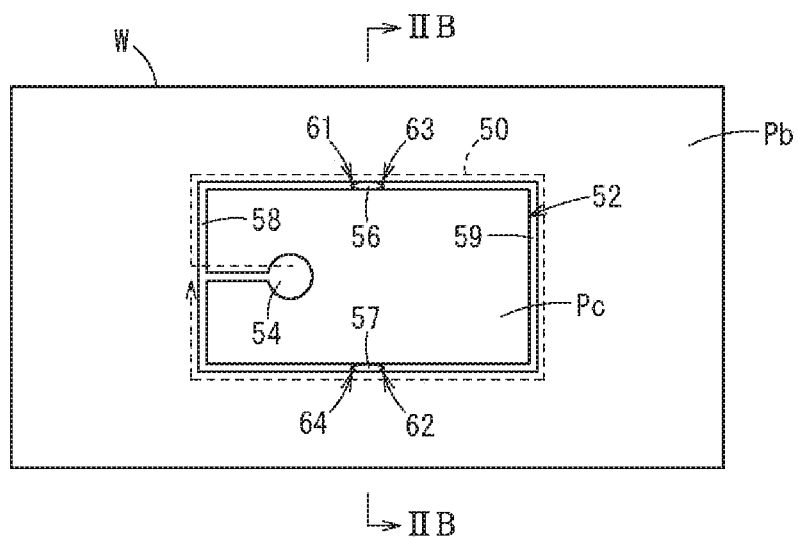
FIG. 2A is a plan view of a workpiece to which with a core fixed thereto.
Figure 2B:
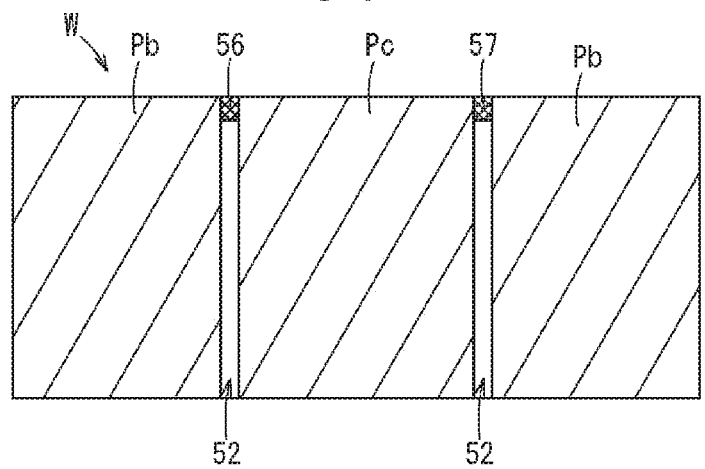
FIG. 2B is a sectional view taken along line IIB-IIB of FIG. 2A.

FIG. 2A is a plan view of the workpiece W with the core Pc fixed thereto. FIG. 2B is a sectional view taken along a line IIB-IIB of FIG. 2A.

As shown in FIG. 2A, by generating electric discharge between the wire electrode 12 and the workpiece W while moving the wire electrode 12 relative to the workpiece W so that the wire electrode 12 moves along the machining path 50 on the workpiece W (indicated by a broken line arrow), a slot 52 having an approximately constant width is formed in the workpiece W. This machined slot 52 has a shape formed as one line segment with a machining start hole 54 at its one end as a start point of the machining path 50 in combination with one rectangle contacting the line segment at the other end.

Fixing tabs 56 and 57 made of deposits are each formed at the midpoint of the long sides of the rectangle formed by the machined slot 52. These fixing tabs 56 and 57 separate the machined slot 52 into two slot parts, or more specifically, a slot part 58 having a substantially E-shape and a slot part 59 having a substantially C-shape.

The upstream end point (the left end point in the figure) of the fixing tab 56 corresponds to the start position of the core fixing function (hereinafter referred to as a fixing start position 61). The upstream end point (the right end point in the figure) of the fixing tab 57 corresponds to the start position of the core fixing function (hereinafter referred to as a fixing start position 62). The downstream end point (the right end point in the figure) of the fixing tab 56 corresponds to the end position of the core fixing function (hereinafter referred to as a fixing end position 63). The downstream end point (the left end point in the figure) of the fixing tab 57 corresponds to the end position of the core fixing function (hereinafter referred to as a fixing end position 64).

As shown in FIG. 2B, the fixing tabs 56 and 57 are each formed at positions near the top surface of the workpiece W. After roughing of the workpiece W is completed, a hammer device arranged in the upper guide unit 35 (FIG. 1) or a hammer attached to an unillustrated robot hand is used to hit the core Pc from above the workpiece W to make it drop away. In this way, since the temporarily fixed core Pc can be easily removed at any time, efficiency improvement of the entire work or an automatic operation can be expected.

It should be noted that the shape of the workpiece W is not limited to the example of FIG. 2A, and the shape of the machining path 50, the length, the number and position of the fixing tabs 56 and 57, the size, number and position of the core Pc may be changed.

<Operation of Wire Electrical Discharge Machine 10>

The wire electrical discharge machine 10 according to this embodiment is configured as described above. Next, the operation of the wire electrical discharge machine 10 (mainly the control unit 18) will be described with reference to the flowchart of FIG. 3. The wire electrical discharge machine 10 starts electrical discharge machining on the workpiece W in accordance with the execution of the machining program by the control unit 18.

Figure 3:
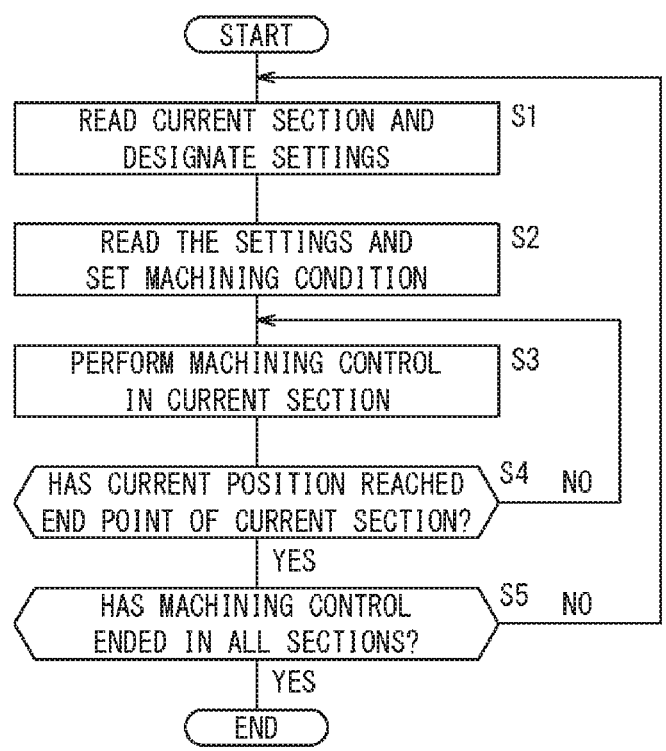
FIG. 3 is a flowchart for explaining the operation of the wire electrical discharge machine shown in FIG. 1.

At step S1 in FIG. 3, the machining condition setter 42 reads positional information on a section (hereinafter referred co as a current section) where electrical discharge machining is to be performed and designates the settings for the current section. This positional information includes, for example, coordinates of feature points (start point, end point and/or relay point), quantities of vectors connecting two points, or shapes of interpolation.

At step S2, the machining condition setter 42 reads control parameters corresponding to the current section set at step S1 to set up a machining condition. For example, when the current section is a section where a core fixing function is used, a "fixing machining condition" is set as a machining condition.

At step S3, the electrical discharge machining controller 44 controls electrical discharge machining in the current section set at step S1 in accordance with the machining condition set at step S2. Thereby, the main machine body 14 and the working fluid processing unit 16 operate in harmony with each other in accordance with the control signal from the electrical discharge machining controller 44.

At step S4, the electrical discharge machining controller 44 determines whether or not the current position on the machining path 50 (hereinafter referred to as the ongoing machining position) has reached the end point of the current section. If it has not reached yet (step S4: NO), the control returns to step S3 so that the electrical discharge machining controller 44 continues control of electrical discharge machining. On the other hand, if it is determined that the end point has been reached (step S4: YES), the control proceeds to the next step (S5).

At step S5, the electrical discharge machining controller 44 determines whether or not control of electrical discharge machining in all sections has ended. If it is determined that the processing has not ended yet (step S5: NO), the control returns to step S1 so that Steps S1 to S4 are sequentially effected. That is, after setting a next section on the machining path 50, control of electrical discharge machining in that section is performed.

On the other hand, when it is determined that machining in all the sections has ended (step S5: YES), the electrical discharge machining controller 44 ends the control of electrical discharge machining on the workpiece W.

Control Method in this Embodiment

<Conventional Problems>

When the fixing tabs 56, 57 are formed in the clearance of the machined slot 52 using the core fixing function, the following problem may arise.

As shown in FIG. 11A, it is assumed that electrical discharge machining of the workpiece W is started from a machining start hole 1 along a machining path 2 (indicated by a broken line). In the example of this figure, it is assumed that a wire electrode 7 (FIG. 11B) has reached an ongoing machining position 5 immediately after forming an approximately C-shaped slot part 3 and a fixing tab 4.

As shown in FIG. 11B, the wire electrode 7 is connected between an upper guide unit 6a and a lower guide unit 6b. As the workpiece W is thicker, the deflection of the wire electrode 7 becomes larger, and an inner wall 8 of the workpiece W tends to proportionally curve toward the wire electrode 7. As a result, the discharge gap between the wire electrode 7 and the inner wall 8 and the distance between the wire electrode 7 and the fixing tab 4 become smaller.

When forming the fixing tab 4 using the core fixing function, it is necessary to change the machining condition when the operation of this function is turned on and off. However, rapid change of the machining condition may cause some physical action (more specifically, decrease or loss of discharge repulsive force accompanying stoppage of power supply) on the wire electrode 7, which in some cases may eliminate the discharge gap between the wire electrode 7 and the workpiece W. To deal with such a situation, there are cases that when a short-circuit between the wire electrode 7 and the inner wall 8 is detected, retraction control is performed to move back the wire electrode 7 a predetermined distance in a direction opposite to the machining direction.

However, in the example of FIG. 11C, when a short-circuit is detected at the ongoing machining position 5, the retracted wire electrode 7 is newly brought into contact with the fixing tab 4 so that the short-circuit of the wire electrode 7 with the workpiece W cannot be canceled. Specifically, when D1<D2 is satisfied, there is a risk that the wire electrode 7 may partially contact the workpiece W and the fixing tab 4 at the same time, hence the short-circuit state of the wire electrode 7 cannot be released. Here, D1 denotes the distance from the fixing tab 4 to the inner wall 8 and D2 denotes the maximum of the curved amount in the inner wall 8.

Figure 12A:
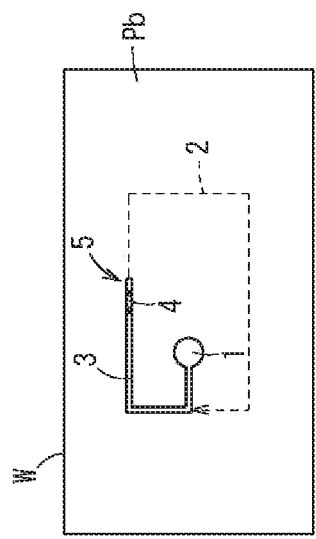

As shown in FIG. 12A, it is assumed that electrical discharge machining of the workpiece W is started from the machining starting hole 1 along the machining path 2 (indicated by a broken line). Since this drawing is the same as that shown in FIG. 11A, its explanation is omitted.

Figure 12B:
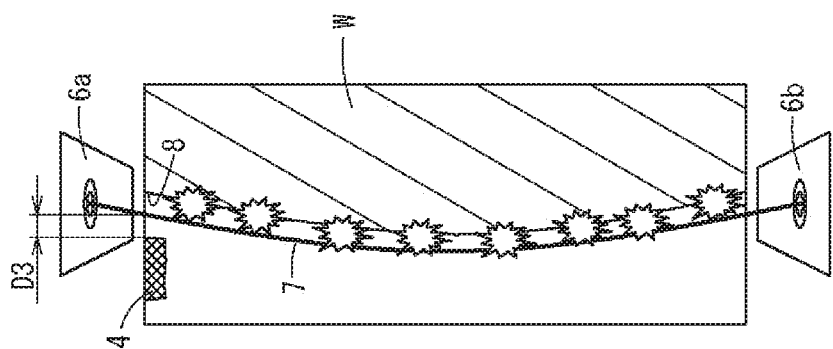

As shown in FIG. 12B, when the fixing tab 4 is formed using the core fixing function, it is necessary to change the machining condition when this function is turned on and off. In this case, similarly to FIG. 11B there are cases where a short-circuit between the wire electrode 7 and the inner wall 8 is detected so that the wire electrode 7 is moved back a predetermined distance in a direction opposite to the machining direction. Here, the distance (separation distance) from the wire electrode 7 to the fixing tab 4 is denoted by D3.

Figure 12C:
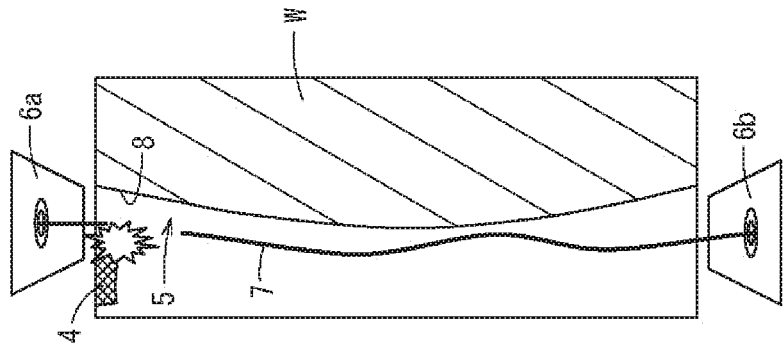

As shown in FIG. 12C, when D3 is not zero but a small value, the short-circuit state of the wire electrode 7 can be canceled, but an instantaneous discharge or an instantaneous short-circuit is likely to occur between the wire electrode 7 and the fixing tab 4, hence there is a concern that the wire electrode 7 breaks at a locally heated location. In particular, when the wire electrode 7 is broken, the fixing tab 4 narrows the spatial margin in the vicinity of the ongoing machining position 5 and the wire electrode 7 is disturbed to be connected and moved. As a result, it is expected that electrical discharge machining is difficult to restart from the interrupted machining position (the ongoing machining position 5).

<Setting Examples of Medial Machining Section INm>

To deal with this, proposed is a control method that can suppress unexpected disconnection of the wire electrode 12 under transient state where the core fixing function is switched from on to off. More specifically, in a section including the fixing end position 63 or 64 (hereinafter referred to as a medial section INm), a machining condition (hereinafter referred to as a medial machining condition) different from both the fixing machining condition and the normal machining condition is set. This medial machining condition may be set up directly or independently, or set by changing either the fixing machining condition or the normal machining condition stepwise over time.

Figure 4A:
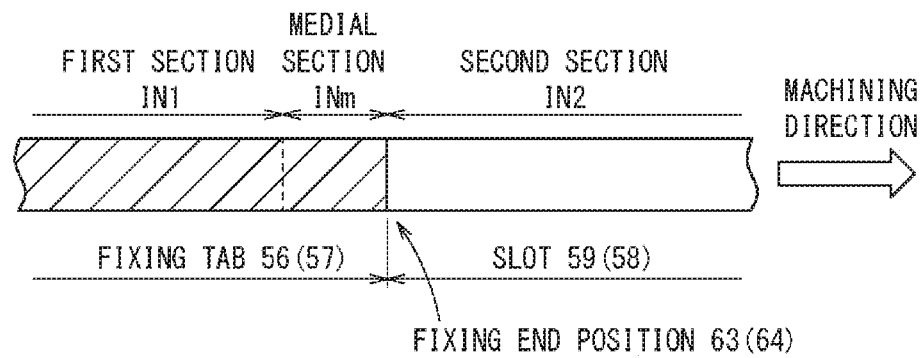
FIGS. 4A to 4C are schematic explanatory diagrams concerning a control method of electrical discharge machining.

In the example of FIG. 4A, the fixing tab 56(57) is located in the first section IN1 and the medial section INm while slot part 59(58) is located in the second section IN2. When the start point of the medial section INm is located at or upstream of, the fixing end position 63(64) as in this case, the machining condition setter 42 sets up a medial machining condition for the medial section INm to perform electric discharge machining suppressed compared to the fixing machining condition. This medial machining condition is a machining condition different from the fixing machining condition and still capable of providing the core fixing function.

Figure 4B:
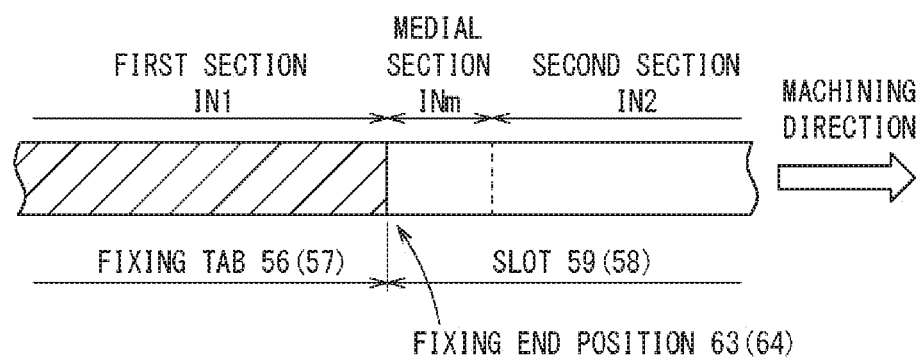

In the example of FIG. 4B, the fixing tab 56(57) is located in the first section IN1. The slot 59(58) is located in the medial section INm and the second section IN2. When the end point of the medial section INm is located at, or downstream of, the fixing end position 63(64) as in this case, the machining condition setter 42 sets up a medial machining condition for the medial section INm to perform electric discharge machining suppressed compared to the normal machining condition. This medial machining condition is a machining condition different from the normal machining condition and still capable of forming the slot 59(58) in the workpiece W.

Figure 4C:
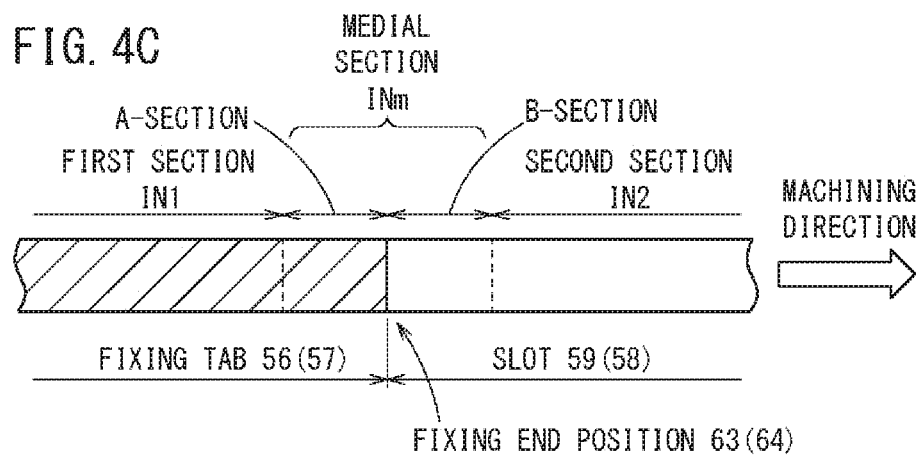

In the example of FIG. 4C, the fixing tab 56(57) is located in a part (A section) over the first section IN1 and the medial section INm. The slot 59(58) is located in a part (B section) over the medial section INm and the second section IN2. In this way, it is possible to combine the conditions in FIGS. 4A and 4B. In this case, the medial machining condition in the A section is a machining condition different from the fixing machining condition and still capable of providing the core fixing function, whereas the medial machining condition in the B section is a machining condition different from the normal machining condition and still capable of forming the slot 59(58) in the workpiece W.

<Setting Examples of Medial Machining Condition>

The machining condition setter 42 may specify a medial machining condition in one medial section INm, with one or multiple settings. Here, the "specifying a medial machining condition with multiple settings" may include discrete or continuous change of control parameters depending on the elapsed time.

For example, as to FIG. 4A or FIG. 4C, the machining condition setter 42 may set a medial machining condition for the medial section INm (A-section in the case of FIG. 4C), with one or multiple settings to, in comparison to the fixing machining condition, [1] lower the average amount of discharge energy between the wire electrode 12 and the workpiece W, [2] lower the machining speed of the workpiece W, [3] weaken the fluid pressure of the working fluid, [4] reduce the flow rate of the working fluid, [5] weaken the tension of the wire electrode 12, [6] make the discharge gap between the wire electrode 12 and the workpiece W greater, or [7] by using any combination of the above settings.

Here, the "machining speed" means a so-called movement speed of the machining axis and corresponds to the relative speed between the wire electrode 12 and the workpiece W. That is, in the above setting example the movement speed of the machining axis can be made relatively slower by changing the moving speed of the die guides 22 and 24 or the table (not shown).

As to FIG. 4B or FIG. 4C, the machining condition setter 42 may set a medial machining condition for the medial section INm (B section in the case of FIG. 4C), with one or multiple settings to, in comparison to the normal machining condition, [1] lower the average amount of discharge energy between the wire electrode 12 and the workpiece W, [2] lower the machining speed of the workpiece W, [3] weaken the fluid pressure of the working fluid, [4] reduce the flow rate of the working fluid, [5] weaken the tension of the wire electrode 12, [6] make the discharge gap between the wire electrode 12 and the workpiece W greater, or [7] by using any combination of the above settings.

For example, decreasing the average amount of discharge energy or enlarging the discharge gap can produce the effect of reducing the amount of discharge generated between the wire electrode 12 and the workpiece W. Further, reducing the fluid pressure of the working fluid or decreasing the flow rate can produce the effect of lowering the tension acting on the wire electrode 12.

Particularly, when the average amount of discharge energy is reduced, in comparison to the fixing machining condition (or the normal machining condition) the machining condition setter 42 may set a medial machining condition by [1] narrowing the pulse width of the discharge current supplied between the wire electrode 12 and the workpiece W, [2] lowering the peak current of the discharge current, [3] extending the rest time of the current pulse of the discharge current, or [4] by using a combination of these. For example, when the rest time is lengthened, only the off-time of the current pulse may be changed to about 10 to 20 times while keeping the on-time of the current pulse.

Further, as to FIG. 4B or FIG. 4C, the machining condition setter 42 may set up a medial machining condition for the medial section INm (B-section in the case of FIG. 4C) so as to include "dwell machining" for keeping discharge while temporarily stopping the movement of the machining position. Use of this dwell machining enables removal of unmachined area remaining on the side of the machining direction (in the forward direction), to thereby produce the effect of assuring an enlarged discharge gap. Here, the machining condition setter 42 may perform dwell machining in all sections of the medial section INm, or may perform dwell machining in only part of the medial section INm. When dwell machining is effected in the entire section of the medial section INm, it is noted that the width of the medial section INm becomes substantially zero.

First Specific Example

Figure 5:
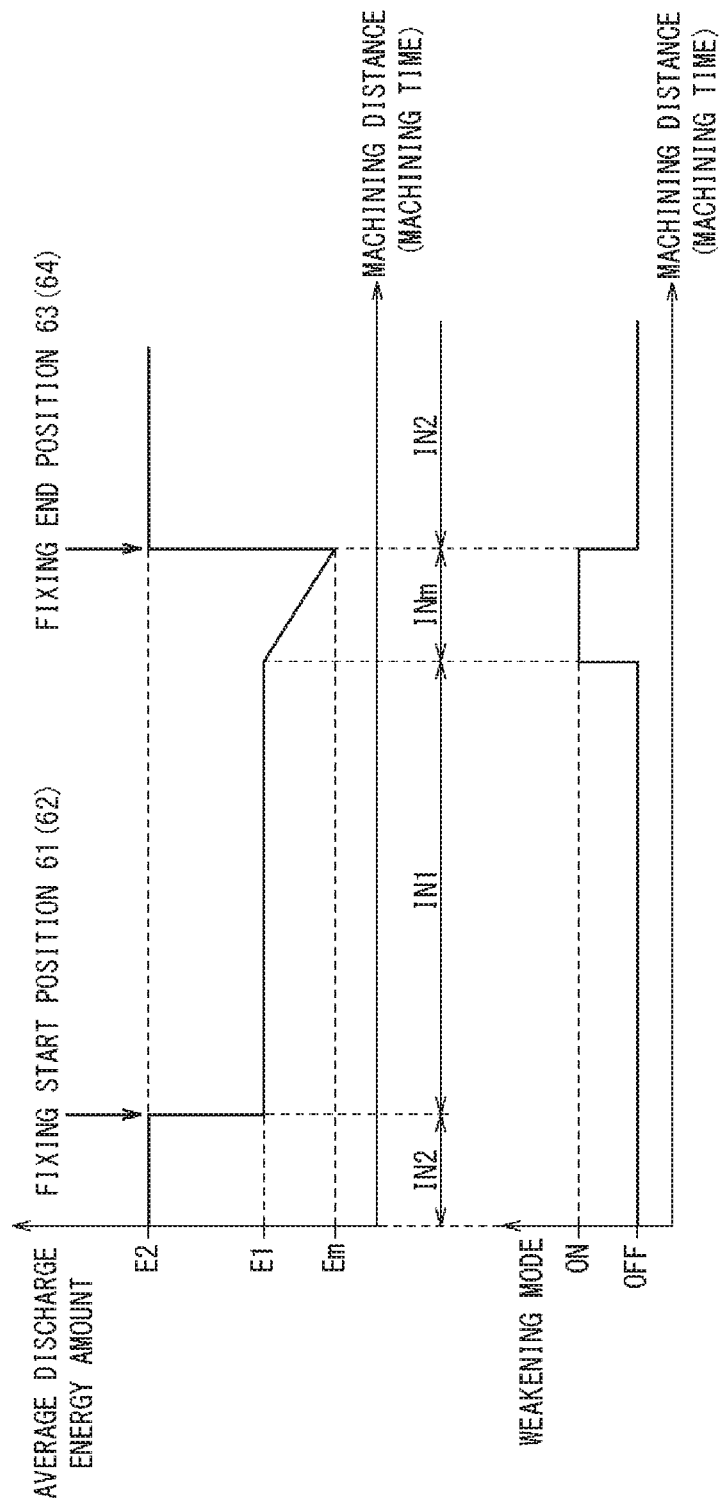
FIG. 5 is a time chart showing temporal change in machining condition for controlling the electrical discharge machining shown in FIG. 4A.

FIG. 5 is a time chart showing temporal change of the machining condition for performing the control of electrical discharge machining shown in FIG. 4A. The horizontal axis in the chart shows the processing distance (or processing time) whereas the vertical axis of the chart shows the average amount of discharge energy. Herein, it is assumed that setting the average amount of discharge energy at E1 satisfies the "fixing machining condition" and setting the average amount of discharge energy at E2 (>E1) satisfies the "normal machining condition".

When the machining position is located in the second section IN2, the average amount of discharge energy is constant at E2. When the ongoing machining position moves from the second section IN2 to the first section IN1 (when the machining position reaches the fixing start position 61 or 62), the average amount of discharge energy changes from E2 to E1. When the ongoing machining position is within the first section IN1, the average amount of discharge energy is kept constant at E1. As the ongoing machining position moves from the first section IN1 to the medial section INm, the average amount of discharge energy gradually decreases down to Em (<E1) when the machining position reaches the fixing end position 63 or 64. Then, when the ongoing machining position moves from the medial section INm to the second section IN2, the average amount of discharge energy changes from Em to E2.

In this control, a "weakening mode" function is provided which gradually decreases the average amount of discharge energy by hardware. In this case, by switching the weakening mode from "OFF" to "ON" in the medial section INm while maintaining the fixing machining condition, the machining condition with the fixing machining condition weakened, that is, the medial machining condition can be obtained. As a means other than this, the control unit 18 (machining condition setter 42) may directly edit the machining program to set up a medial section INm and a medial machining condition.

Figure 6:
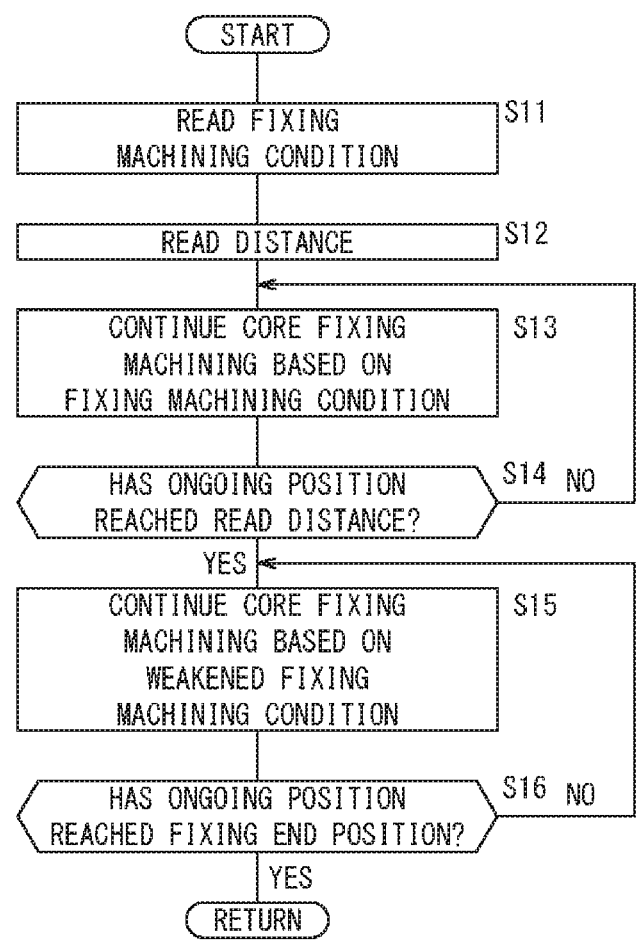
FIG. 6 is a flowchart for controlling the electrical discharge machining corresponding to the time chart of FIG. 5.

Next, the control of electrical discharge machining corresponding to the time chart of FIG. 5 will be described with reference to the flowchart of FIG. 6. Here, the operation of the control unit 18 while the core fixing function is active will be described in detail.

At step S11, the machining condition setter 42 reads control parameters corresponding to the first section IN1 and sets the fixing machining condition. In the example of FIG. 5, the fixing machining condition includes the average amount of discharge energy (E1). Then, the core fixing function is started. That is, wire electrical discharge machining with the core fixing function actuated is started.

At step S12, the machining condition setter 42 reads the distance from the fixing end position 63 or 64. In the example of FIG. 4A, since the end points of the medial section INm and the fixing tab 56 or 57 coincide with each other, this "distance" substantially represents the length of the medial section INm (e.g., in the order of some hundreds μm to some mm). The set value of "distance" may be arbitrarily changed depending on the thickness of the workpiece W, the diameter of the wire electrode 12, or other control parameters.

At step S13, the electrical discharge machining controller 44 continues control of electrical discharge machining for effecting the core fixing function according to the fixing machining condition read at step S11.

At step S14, the electrical discharge machining controller 44 determines whether or not the ongoing machining position has reached the distance read at step S12. If it has not reached yet (step S14: NO), the control returns to step S13, and step S13 is repeated until this distance is reached. That is, when the ongoing machining position is within the first section IN1, the control following the fixing machining condition is continued. On the other hand, when this distance has been reached (step S14: YES), the control proceeds to the next step (S15).

At step S15, the electrical discharge machining controller 44 continues electrical discharge machining control for providing the core fixing function following the medial machining condition with the fixing machining condition weakened.

At step S16, the electrical discharge machining controller 44 determines whether or not the ongoing machining position has reached the fixing end position 63 or 64. If it has not reached yet (step S16: NO), the control returns to step S15, and step S15 is repeated until the fixing end position 63 or 64 is reached. That is, if the ongoing machining position is within the medial section INm, the control following the medial machining condition is continued.

On the other hand, when the fixing end position 63 or 64 is reached (step S16: YES), this control is terminated. Hereinafter, the control unit 18 performs control of electrical discharge machining in the second section IN2, in accordance with the normal machining condition.

Second Specific Example

FIG. 7 is a time chart showing temporal change of the machining condition for performing the control of electrical discharge machining shown in FIG. 4B. The horizontal axis in the chart shows the processing distance (or processing time) whereas the vertical axis of the chart shows the average amount of discharge energy. As in the case of FIG. 5, it is assumed that setting the average amount of discharge energy at E1 satisfies the "fixing machining condition" and setting the average amount of discharge energy at E2 satisfies the "normal machining condition".

When the ongoing machining position is located within the second section IN2, the average amount of discharge energy is constant at E2. When the ongoing machining position moves from the second section IN2 to the first section IN1 (when the ongoing machining position reaches the fixing start position 61 or 62), the average amount of discharge energy changes from E2 to E1. When the ongoing machining position is within the first section IN1, the average amount of discharge energy is kept constant at E1. As the ongoing machining position moves from the first section IN1 to the medial section INm (when the ongoing machining position reaches the fixing end position 63 or 64), the average amount of discharge energy gradually increases after a drop from E1 to the zero value. Thereafter, when the ongoing machining position reaches the end point of the medial section INm, the average amount of discharge energy rises to Em. When the ongoing machining position moves from the medial section INm to the second section IN2, the average amount of discharge energy jumps from Em to E2.

In this control, a "weakening mode" function is provided which gradually increases the average amount of discharge energy by hardware. Here, by switching the weakening mode from "OFF" to "ON" in the medial section INm after transition to the normal machining condition at the fixing end position 63 or 64, the machining condition with the normal machining condition weakened, that is, the medial machining condition can be obtained.

Third Specific Example

FIG. 8 is a time chart showing temporal change of the machining condition for performing control of electrical discharge machining shown in FIG. 4C. The horizontal axis in the chart shows the processing distance (or processing time) and the vertical axis of the chart shows the average amount of discharge energy. Similarly to the case of FIGS. 5 and 7, it is assumed that setting the average amount of discharge energy at E1 satisfies the "fixing machining condition" and setting the average amount of discharge energy at E2 satisfies the "normal machining condition".

When the ongoing machining position is located within the second section IN2, the average amount of discharge energy is constant at E2. When the ongoing machining position moves from the second section IN2 to the first section IN1 (when the ongoing machining position reaches the fixing start position 61 or 62), the average amount of discharge energy changes from E2 to E1. When the ongoing machining position is within the first section IN1, the average amount of discharge energy is kept constant at E1. As the ongoing machining position moves from the first section IN1 to the A-section (the first half of the medial section INm), the average amount of discharge energy gradually decreases down to Em when the ongoing machining position reaches the fixing end position 63 or 64. As the ongoing machining position moves from the A-section to the B-section (the second half of the medial section INm), the average amount of discharge energy gradually increases and takes a value of E1 when the ongoing machining position reaches the end point of the medial section INm. Further, as the ongoing machining position moves from the medial section INm (B-section) to the second section IN2, the average amount of discharge energy jumps from E1 to E2.

In this control, a "weakening mode" function is provided which gradually decreases the average amount of discharge energy by hardware. Here, by switching the weakening mode from "OFF" to "ON" in the A-section, the machining condition with the fixing work machining condition weakened, that is, the medial machining condition for the A-section can be obtained. Further, keeping the weakening operation at "ON" after transmit to the normal machining condition at the fixing end position 63 or 64 can produce the machining condition with the normal machining condition weakened, that is, the medial machining condition for the B-section.

Fourth Specific Example

FIG. 9 is a time chart showing temporal change of the machining condition for performing control of electrical discharge machining shown in FIG. 4B. The horizontal axis in the chart shows the processing time and the vertical axis of the chart shows the average amount of discharge energy. It is assumed that setting the average amount of discharge energy at E1 with the machining speed of the workpiece W kept constant satisfies the "fixing machining condition" and setting the average amount of discharge energy at E2 with the machining speed of the workpiece W kept constant satisfies the "normal machining condition".

When the current time in machining is within the second section IN2, the average amount of discharge energy is constant at E2. When the current time in machining transitions from the second section IN2 to the first section IN1 (when the ongoing machining position reaches the fixing start position 61 or 62), the average amount of discharge energy changes from E2 to E1. When the current time in machining is within the first section IN1, the average amount of discharge energy is constant at E1.

When moving from the first section IN1 to the medial section INm (when the ongoing machining position reaches the fixing end position 63 or 64), dwell machining is executed by temporarily setting the machining speed at zero while keeping other processing settings as they are. As the discharge gap becomes larger, the average amount of discharge energy gradually decreases, and the average amount of discharge energy approaches zero before the dwell time ends. Thereafter, when the current time in machining transitions from the medial section INm to the second section IN2, the average amount of discharge energy jumps from zero to E2.

Next, control of electrical discharge machining corresponding to the time chart of FIG. 9 will be described with reference to the flowchart of FIG. 10. Here, the operation of the control unit 18 while the core fixing function is effected will be described in detail.

At step S21, the machining condition setter 42 reads control parameters corresponding to the first section IN1 and sets the fixing machining condition. In the example of FIG. 9, the fixing machining condition includes the average amount of discharge energy (E1). Then, the core fixing function is started. That is, wire electrical discharge machining with the core fixing function actuated is started.

At step S22, the machining condition setter 42 reads the rest time (so-called dwell time) for dwell machining. The set value of the "dwell time" may be arbitrarily changed depending on the thickness of the workpiece W, the diameter of the wire electrode 12, or other control parameters.

At step S23, the electrical discharge machining controller 44 continues control of electrical discharge machining for effecting the core fixing function according to the fixing machining condition read at step S21.

At step S24, the electrical discharge machining controller 44 determines whether or not the ongoing machining position has reached the fixing end position 63 or 64. If it has not reached yet (step S24: NO), the control returns to step S23, and step S23 is repeated until this position is reached. That is, when the ongoing machining position is within the first section IN1, the control following the fixing machining condition is continued. On the other hand, when the fixing end position 63 or 64 is reached (step S24: YES), the control proceeds to the next step (S25).

At step S25, the electrical discharge machining controller 44 stops the axial feed of the table with the workpiece W placed thereon while continuing discharge control under the fixing machining condition. That is, the electrical discharge machining controller 44 starts and continues the dwell machining in the vicinity of the fixing end position 63 or 64.

At step S26, the electrical discharge machining controller 44 determines whether or not the dwell time read at step S22 has elapsed from the start of dwell machining. If it has not elapsed yet (step S26: NO), the control returns to step S25, and the dwell machining (step S25) is effected until the dwell time elapses.

On the other hand, when the dwell time has elapsed from the start of the dwell machining (step S26: YES), this control is terminated. Hereinafter, the control unit 18 controls electrical discharge machining in accordance with the normal machining condition in the second section IN2.

Effect of this Embodiment

As described heretofore, the wire electrical discharge machine 10 is a machine tool that performs electrical discharge machining on a workpiece W along a machining path 50 by generating electric discharge between a wire electrode 12 and the workpiece W while moving the wire electrode 12 and the workpiece W relatively to each other, and has a core fixing function of fixing a core Pc created by the electrical discharge machining to a base material Pb of the workpiece W by adhering and depositing a component of the wire electrode 12 arising from the electric discharge machining.

This wire electrical discharge machine 10 includes: [1] a machining condition setter 42 configured to set up a machining condition related to the electrical discharge machining for each of multiple sections on the machining path 50; and [2] an electrical discharge machining controller 44 configured to perform control of the electrical discharge machining in accordance with the machining condition set for each section by the machining condition setter 42. In this configuration, [3] as the machining conditions, the machining condition setter 42 sets up: (3a) a first machining condition for enabling the core fixing function in a first section IN1 on the upstream side; (3b) a second machining condition for enabling formation of a slot 58, 59 in the workpiece W in a second section IN2 on the downstream side; and (3c) a medial machining condition that is different from the fixing machining condition and the normal machining condition in a medial section INm located between the first section IN1 and the second section IN2.

In this way, since the medial machining condition different from both the fixing machining condition and the normal machining condition are set in the medial section INm between the first section IN1 on the upstream side and the second section IN2 on the downstream side, it is possible to change the machining condition in the medial section INm, stepwise from the fixing machining condition to the normal machining condition. That is, changing the machining condition in a stepwise manner makes it possible to reduce the influence from physical factors on the wire electrode 12, hence prevent the wire electrode 12 from approaching or contacting the fixing tab 56 or 57 formed immediately before. With this, it is possible to prevent occurrence of an unintentional unrestorable event under a transient state where the core fixing function is switched from on to off and avoid unexpected disconnection of the wire electrode 12.

Particularly, in the wire electrical discharge machine 10 having the core fixing function, the spatial margin in the machined slot 52 is narrowed by the formed fixing tab 56 or 57, so that the connection and motion of the wire electrode 12 is hindered. The present invention can exhibit remarkable effectiveness in such a situation.

The machining condition setter 42 described in [3] above may set up (3d) execution of dwell machining using the fixing machining condition at the fixing end position 63 or 64 of the first section IN1. Use of this dwell machining enables removal of unmachined area remaining on the side of the machining direction (in the forward direction), hence produces the effect of enlarging the discharge gap. That is, it is possible to prevent the wire electrode 12 from approaching or contacting the fixing tab 56 or 57 formed immediately before, hence prevent occurrence of an unintentional unrestorable event under a transient state where the core fixing function is switched from on to off and avoid unexpected disconnection of the wire electrode 12.

Remarks

It should be noted that the present invention is not limited to the above-described embodiment, but can be freely changed without departing from the gist of the present invention. Alternatively, each of configurations may be arbitrarily combined with others as long as no technical inconsistency occurs.

What is claimed is:

1. A wire electrical discharge machine that performs electrical discharge machining on a workpiece along a machining path by generating electric discharge between a wire electrode and the workpiece while moving the wire electrode and the workpiece relatively to each other, and has a core fixing function of fixing a core created by the electrical discharge machining to a base material of the workpiece by adhering and depositing a component of the wire electrode arising from the electric discharge machining, comprising:

a machining condition setter configured to set up a machining condition related to the electrical discharge machining for each of multiple sections on the machining path; and an electrical discharge machining controller configured to perform control of the electrical discharge machining in accordance with the machining condition set for each section by the machining condition setter, wherein as the machining conditions, the machining condition setter is configured to set up:

a first machining condition for enabling the core fixing function in a first section on an upstream side, and a second machining condition for enabling formation of a slot in the workpiece in a second section on a downstream side, and the machining condition setter performs electric discharge machining according to a medial machining condition that is different from the first machining condition and the second machining condition in a medial section located between the first section and the second section.

2. The wire electrical discharge machine according to claim 1, wherein:
the medial section has a start point upstream of an end position of the core fixing function and an end point at a position of the end position of the core fixing function; and
the machining condition setter is configured to set the medial machining condition by suppressing the electrical discharge machining in comparison with the first machining condition.

3. The wire electrical discharge machine according to claim 2, wherein the machining condition setter is configured to specify the medial machining condition, with such settings as to, in comparison with the first machining condition, lower an average amount of discharge energy between the wire electrode and the workpiece, lower a machining speed of the workpiece, weaken a fluid pressure of a dielectric working fluid, reduce a flow rate of the dielectric working fluid, weaken a tension of the wire electrode, or make a discharge gap between the wire electrode and the workpiece greater, or by using any combination of the above settings.

4. The wire electrical discharge machine according to claim 3, wherein the machining condition setter is configured to specify the medial machining condition so as to relatively reduce the average amount of discharge energy in comparison with the first machining condition by narrowing a pulse width of the discharge current supplied between the wire electrode and the workpiece, lowering a peak current of a discharge current, or extending a rest time of a current pulse of the discharge current, or by using a combination of the above settings.

5. The wire electrical discharge machine according to claim 1, wherein:
the medial section has a start point at an end position of the core fixing function and an end point at a position downstream of the end position of the core fixing function; and
the machining condition setter is configured to set the medial machining condition with the electrical discharge machining suppressed in comparison with the second machining condition.

6. The wire electrical discharge machine according to claim 5, wherein the machining condition setter is configured to specify the medial machining condition, with such settings as to, in comparison with the second machining condition, lower an average amount of discharge energy between the wire electrode and the workpiece, lower a machining speed of the workpiece, weaken a fluid pressure of a dielectric working fluid, reduce a flow rate of the dielectric working fluid, weaken a tension of the wire electrode, or make a discharge gap between the wire electrode and the workpiece greater, or by using any combination of the above settings.

7. The wire electrical discharge machine according to claim 6, wherein the machining condition setter is configured to specify the medial machining condition so as to relatively reduce the average amount of discharge energy in comparison with the second machining condition by narrowing a pulse width of a discharge current supplied between the wire electrode and the workpiece, lowering a peak current of the discharge current, or extending a rest time of a current pulse of the discharge current, or by using a combination of the above settings.

8. The wire electrical discharge machine according to claim 5, wherein the machining condition setter is configured to set the medial machining condition so as to include execution of dwell machining.

9. The wire electrical discharge machine according to claim 1, wherein:
the medial section has a start point upstream of an end position of the core fixing function and an end point at a position downstream of the end position of the core fixing function; and
the machining condition setter is configured to set the medial machining condition with the electrical discharge machining suppressed in comparison with the first machining condition, from the start point of the medial section to the end position of the core fixing function, and sets the medial machining condition with the electrical discharge machining suppressed in comparison with the second machining condition, from the end position of the core fixing function to the end point of the medial section.

10. The wire electrical discharge machine according to claim 9, wherein the machining condition setter is configured to specify the medial machining condition, with such settings as to, in comparison with the first machining condition, lower an average amount of discharge energy between the wire electrode and the workpiece, lower a machining speed of the workpiece, weaken a fluid pressure of a dielectric working fluid, reduce a flow rate of the dielectric working fluid, weaken a tension of the wire electrode, or make a discharge gap between the wire electrode and the workpiece greater, or by using any combination of the above settings.

11. The wire electrical discharge machine according to claim 10, wherein the machining condition setter is configured to specify the medial machining condition so as to relatively reduce the average amount of discharge energy in comparison with the first machining condition by narrowing a pulse width of a discharge current supplied between the wire electrode and the workpiece, lowering a peak current of the discharge current, or extending a rest time of a current pulse of the discharge current, or by using a combination of the above settings.

12. The wire electrical discharge machine according to claim 9, wherein the machining condition setter is configured to specify the medial machining condition, with such settings as to, in comparison with the second machining condition, lower an average amount of discharge energy between the wire electrode and the workpiece, lower a machining speed of the workpiece, weaken a fluid pressure of a dielectric working fluid, reduce a flow rate of the dielectric working fluid, weaken a tension of the wire electrode, or make a discharge gap between the wire electrode and the workpiece greater, or by using any combination of the above settings.

13. The wire electrical discharge machine according to claim 12, wherein the machining condition setter is configured to specify the medial machining condition so as to relatively reduce the average amount of discharge energy in comparison with the second machining condition by narrowing a pulse width of a discharge current supplied between the wire electrode and the workpiece, lowering a peak current of the discharge current, or extending a rest time of a current pulse of the discharge current, or by using a combination of the above settings.

14. The wire electrical discharge machine according to claim 9, wherein the machining condition setter is configured to set the medial machining condition by including execution of dwell machining.

15. A wire electrical discharge machine that performs electrical discharge machining on a workpiece along a machining path by generating electric discharge between a wire electrode and the workpiece while moving the wire electrode and the workpiece relatively to each other, and has a core fixing function of fixing a core created by the electrical discharge machining to a base material of the workpiece by adhering and depositing a component of the wire electrode arising from the electric discharge machining, comprising:
- a machining condition setter configured to set up a machining condition related to the electrical discharge machining for each of multiple sections on the machining path; and
- an electrical discharge machining controller configured to perform control of the electrical discharge machining in accordance with the machining condition set for each section by the machining condition setter,
- wherein as the machining conditions, the machining condition setter sets up:
  - a first machining condition for enabling the core fixing function in a first section on an upstream side,
  - a second machining condition for enabling formation of a slot in the workpiece in a second section on a downstream side, and
  - an execution of dwell machining in the first machining condition, at the end position of the first section.

16. A wire electrical discharge machining method for use in a wire electrical discharge machine that performs electrical discharge machining on a workpiece along a machining path by generating electric discharge between a wire electrode and the workpiece while moving the wire electrode and the workpiece relatively to each other, and has a core fixing function of fixing a core created by the electrical discharge machining to a base material of the workpiece by adhering and depositing a component of the wire electrode arising from the electric discharge machining, comprising:
- a setting step of setting a machining condition related to the electrical discharge machining for each of multiple sections on the machining path; and
- a control step of performing control of the electrical discharge machining in accordance with the machining condition set for each section at the setting step,
- wherein the machining conditions set at the setting step include:
  - a first machining condition for effecting the core fixing function in a first section on an upstream side, and
  - a second machining condition for enabling formation of a slot in the workpiece in a second section on a downstream side, and
- a machining condition setter performs electric discharge machining according to a medial machining condition that is different from the first machining condition and the second machining condition in a medial section located between the first section and the second section.

* * * * *